US007975232B2

(12) United States Patent
Bohle

(10) Patent No.: US 7,975,232 B2
(45) Date of Patent: Jul. 5, 2011

(54) SYSTEMS AND METHODS FOR EXTENSIBLE DOCUMENT GENERATION

(75) Inventor: Holger Bohle, Dielheim (DE)

(73) Assignee: SAP AG, Walldorf (DE)

( * ) Notice: Subject to any disclaimer, the term of this patent is extended or adjusted under 35 U.S.C. 154(b) by 357 days.

(21) Appl. No.: 11/263,518

(22) Filed: Oct. 31, 2005

(65) Prior Publication Data
US 2007/0101253 A1   May 3, 2007

(51) Int. Cl.
G06F 17/00 (2006.01)
G06F 3/048 (2006.01)
G06F 17/20 (2006.01)
G06F 17/21 (2006.01)
G06F 17/22 (2006.01)

(52) U.S. Cl. ........ 715/762; 715/221; 715/234; 715/235; 715/764; 715/780

(58) Field of Classification Search .................. 715/762; 709/203
See application file for complete search history.

(56) References Cited

U.S. PATENT DOCUMENTS

| 5,552,982 | A  | * | 9/1996  | Jackson et al.  | 715/210 |
| 6,144,990 | A  | * | 11/2000 | Brandt et al.   | 709/203 |
| 6,717,593 | B1 | * | 4/2004  | Jennings        | 715/760 |
| 6,941,521 | B2 | * | 9/2005  | Lin et al.      | 715/762 |
| 7,287,229 | B2 | * | 10/2007 | Forkner et al.  | 715/762 |
| 2001/0051961 | A1 | * | 12/2001 | Duxbury       | 707/517 |
| 2002/0078147 | A1 | * | 6/2002  | Bouthors et al. | 709/203 |
| 2002/0196281 | A1 | * | 12/2002 | Audleman et al. | 345/762 |
| 2004/0039989 | A1 | * | 2/2004  | Warren        | 715/505 |
| 2005/0091582 | A1 | * | 4/2005  | Snover et al.   | 715/513 |
| 2006/0036612 | A1 | * | 2/2006  | Harrop et al.   | 707/100 |

OTHER PUBLICATIONS

WordPress Codex Managing Plugins, Sep. 5, 2005, http://web.archive.org/web/20050905081929/http://codex.wordpress.org/Managing_Plugins.*
PHP Function Exist, Jul. 23, 2003, http://web.archive.org/web/20040408020950/us3.php.net/function_exists.*
Check if function exists, Jul. 9, 2004, http://www.webdeveloper.com/forum/showthread.php?t=39157.*
Mike Soulier, Simple CGI Template Processing with Python, 2002, http://www.pyzine.com/Issue001/Section_Articles/article_PythonCGI.html.*
Dynamic Web templates with dTemplate, Aug. 17, 2004, 5 pages.*

* cited by examiner

*Primary Examiner* — Tadeese Hailu
*Assistant Examiner* — Yongjia Pan
(74) *Attorney, Agent, or Firm* — Kenyon & Kenyon LLP

(57) ABSTRACT

A method of document generation includes, in response to a call from an application, getting an interface and interface description of a template used to create a document, determining whether a method exists for filling all elements of the interface, making a dynamic call to invoke the method for filling all elements of the interface if the method exists, decomposing the interface into further elements if a method does not exist for filling all elements of the interface, repeating the steps of determining whether a method exists, making a dynamic call and decomposing the interface, until all elements of the interface are accounted for.

6 Claims, 5 Drawing Sheets

SYSTEMS AND METHODS FOR EXTENSIBLE DOCUMENT GENERATION

BACKGROUND OF THE DISCLOSURE

1. Field of the Disclosure

The present disclosure relates generally to document generation and in particular, to systems and methods for extensible document generation.

2. Description of the Related Art

Computer software such as computer applications often provide feedback to a user via displayed screen messages. These screen messages are generally temporary and will disappear after a certain amount of time. Some applications also have notification or correspondence capabilities for notifying or corresponding with a user and/or one or more third parties. These types of applications generally provide the notification or correspondences on a predefined communication channel. Examples of types of communication channels that may be used include printer, facsimile, mail, SMS/MMS, etc.

The contents of the notification or correspondence may include, for example, confirmation that an action has been taken or directions instructing the user what they should do next. Sometimes, an action may result in a number of notifications or correspondences having to be output to one or more parties. An example might be if a user purchases an item in a buyer portal and their manager wants to confirm the transaction. In this case, the user may get a notification such as a confirmation acknowledging receipt of the purchase request and the manager may get a notification that they need to accept the transaction.

The connection between business processes and the notifications that are to be provided is often customizable. For example, customers can often predefine what content is sent on a certain communication channel to a particular user group for certain business processes. Some applications provide no fixed document generation at all and customers need to create their own documents or tailor existing documents to their own needs. Examples of these types of applications include those that provide functionality to "buy" or "request" items from the system. An example would be a portal such as a learning portal. The learning portal may provide a learning catalog with learning material like class-room courses, web-based or computer-based training, etc. Users (e.g., employees) can look through the catalog and enroll or buy training sessions. The user's manager may request a list of all training sessions in which the user participates. Another example would be an application that provides tracking information, for example, for tracking the status of an item being shipped. Although there may not be any change in the status of a delivery, someone may still request the current status on an item being shipped. In this case, in response to a user request, the application will read the current status of the order, and generate and return to the user a document indicating the current status.

In general, correspondence is a very generic service of an application. In fact, often many different processes may call a generic correspondence service to, for example, send a confirmation. Accordingly, although the correspondence service's functionality itself is independent of the particular process making the call to it, the content of the correspondence generated by the correspondence service depends on the process making the call.

Accordingly, in general a static document is not sent out for all cases. Instead, systems are generally designed to generate a document for each request. The same is true, for example, for requesting pages from a web server. The document generation process is generally template driven. A Template is a document containing both static text and empty spaces or place holders (e.g., attributes) for dynamic content which will be defined at execution time. During document generation, the attributes are filled in by the application with values from the business process. Examples of values that may be filled in include item ID, date, the receiver, etc. Getting the business data into the document being generated can be performed, for example, using interactive forms based on Adobe software. This system uses a template that provides an interface. The interface describes the different fields in the template that need to be filled in order to generate the document. An application generating the document calls the interface of the template and provides the attributes as interface values.

One short coming of present systems is that since the correspondence service is a generic service and there may be many different templates and different interfaces for each business process, the correspondence service has to be aware of every single template that might be called and every single interface. This makes it very difficult to change the template, the interface or add a business process. For example, to add a new field to a template, a new field will need to be added to the interface. In addition, if a new business process is added which requires a new template, it will have to be introduced to the correspondence service so that the correct interface can be generated.

Usually, there is a data provider responsible for filling in the template's interface attribute on a single field level. Accordingly, there may be a different method used for each field.

From the template's point of view, the template depends on the particular business process (e.g., buying, cancellation, etc.) Accordingly, different templates have different interfaces and thus, the application has to know every single interface.

From an application's point of view, it would be a good idea to have different templates that use the same attributes and interfaces. The benefit would be that different documents could be generated by the system if the interface is the same in one generic correspondence service. Accordingly, many of these correspondence services predefine an interface with an enumeration of all possible attributes. Thus, the correspondence service becomes a generic application service. One drawback however, is that the application no longer knows what attributes are actually used in a template. The application always has to fill all fields of the interfaces and this reduces system performance.

In addition, customers may want to enrich the functionality of the correspondence service by adding customer made attributes. For example, a customer may want to add their own branding and/or some additional data to the correspondence. As the attributes are exposed in the interface, adding a new attribute would change the interface which would require changes in the generic correspondence service. These changes may require a substantial amount of code changes. Accordingly, this is quite inflexible from the customer's point of view.

An example of a system having a hard dependency between application, template interface and template is shown FIG. 1. An application 10 makes calls to template interface specific data provider interfaces 12 and 14 to fill the attributes of templates 16, 18, respectively. Data provider interfaces 12, 14 are each responsible for calling data provider 20 and for filling the template interface attributes on a single field level. Accordingly, data provider interfaces uses a specific method for filling each field. Calls by data provider interfaces 12 and 14 are answered by data provider 20 utilizing the data stored in database 22.

One major shortcoming of the above-noted systems is that there are two relationships, one from the application to the template and the other from the application to the data provider. Every change in the template requires an adaptation of the application and every change in the application requires the template to be adapted.

SUMMARY

The present disclosure describes tools (in the form of methodologies, apparatuses, and systems) for document generation. The tools may be embodied in one or more computer programs stored on a computer readable medium or program storage device and/or transmitted in the form of a computer data signal in one or more segments via a computer network or other transmission medium.

A method of document generation comprises in response to a call from an application, getting an inter-face and interface description of a template used to create a document, determining whether a method exists for filling all elements of the interface, making a dynamic call to invoke the method for filling all elements of the interface if the method exists, decomposing the interface into further elements if a method does not exist for filling all elements of the interface and repeating the steps of determining whether a method exists, making a dynamic call and decomposing the interface, until all elements of the interface are accounted for.

A system for document generation comprises a system for, in response to a call from an application, getting an interface and interface description of a template used to create a document, a system for determining whether a method exists for filling all elements of the interface, a system for making a dynamic call to invoke the method for filling all elements of the interface if the method exists, a system for decomposing the interface into further elements if a method does not exist for filling all elements of the interface and a system for repeating the steps of determining whether a method exists, making a dynamic call and decomposing the interface, until all elements of the interface are accounted for.

A computer recording medium including computer executable code for document generation comprises code for, in response to a call from an application, getting an interface and interface description of a template used to create a document, code for determining whether a method exists for filling all elements of the interface, code for making a dynamic call to invoke the method for filling all elements of the interface if the method exists, code for decomposing the interface into further elements if a method does not exist for filling all elements of the interface and code for repeating the steps of determining whether a method exists, making a dynamic call and decomposing the interface, until all elements of the interface are accounted for.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 5:
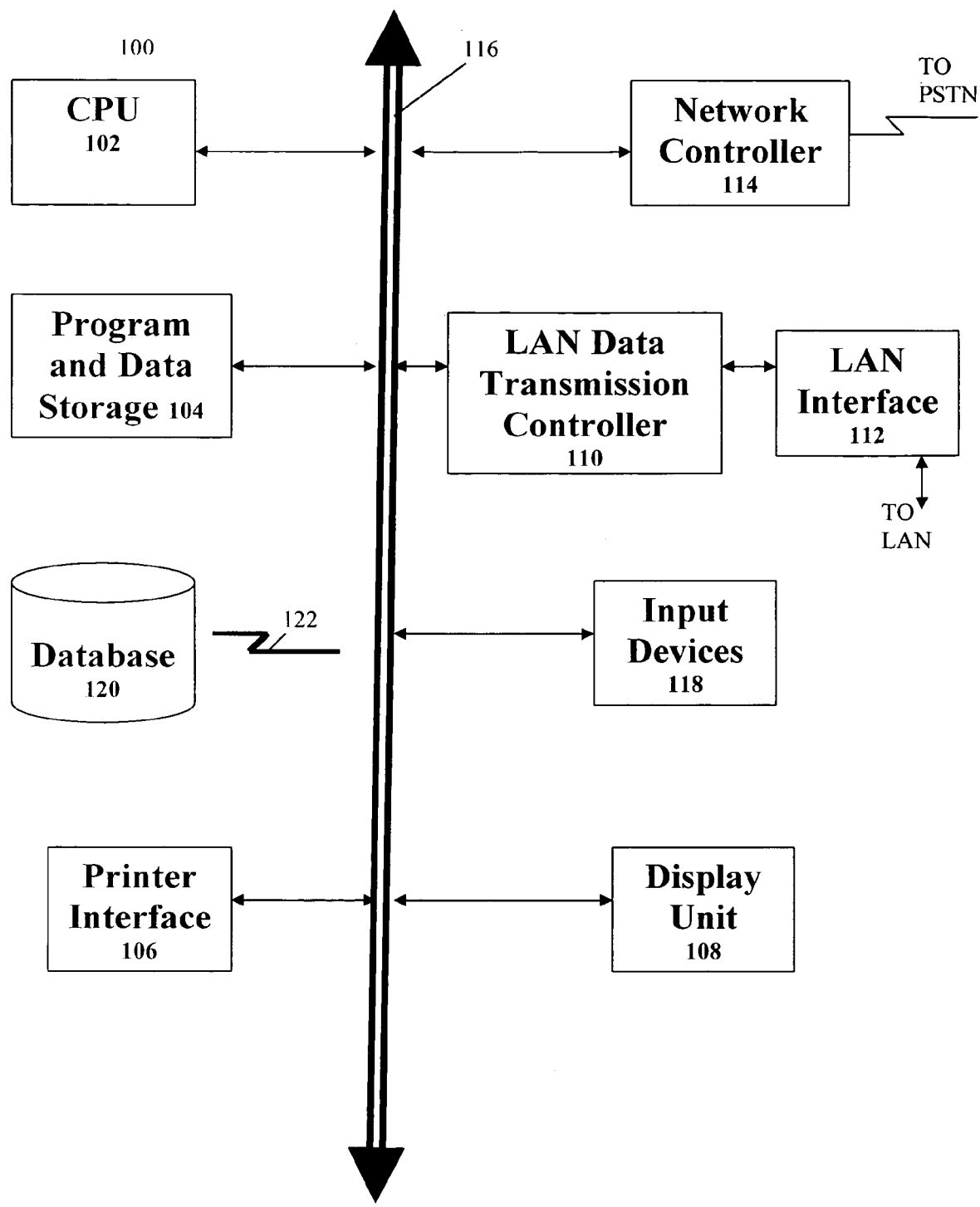
FIG. 5 is a block diagram of a computer system capable of implementing various aspects of the embodiments of the present disclosure.

FIG. 5 shows an example of a computer system 100 which may implement the methods and systems of the present disclosure. The systems and methods of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

The present disclosure relates to systems and methods for extensible document generation. According to various embodiments of the present disclosure, a system is provided that does not rely on the use of template interface specific interfaces and does not make a hard dependency between application and template. For example, according to an embodiment of the present disclosure, the system will make a dynamic call to the template to get the interface and interface description of the template. The system will make a dynamic call to get the appropriate data provider interface(s) for filling the templates interface. The system will dynamically call the appropriate data provider for each field so that all attributes for the template can be filled. The application can thus query the interface of a template and dynamic calls can be generated to generate the templates document. The application will make the dynamic calls to fill the templates interface using Run Time Type Information (RTTI) also known as Reflections in JAVA.

Figure 1:
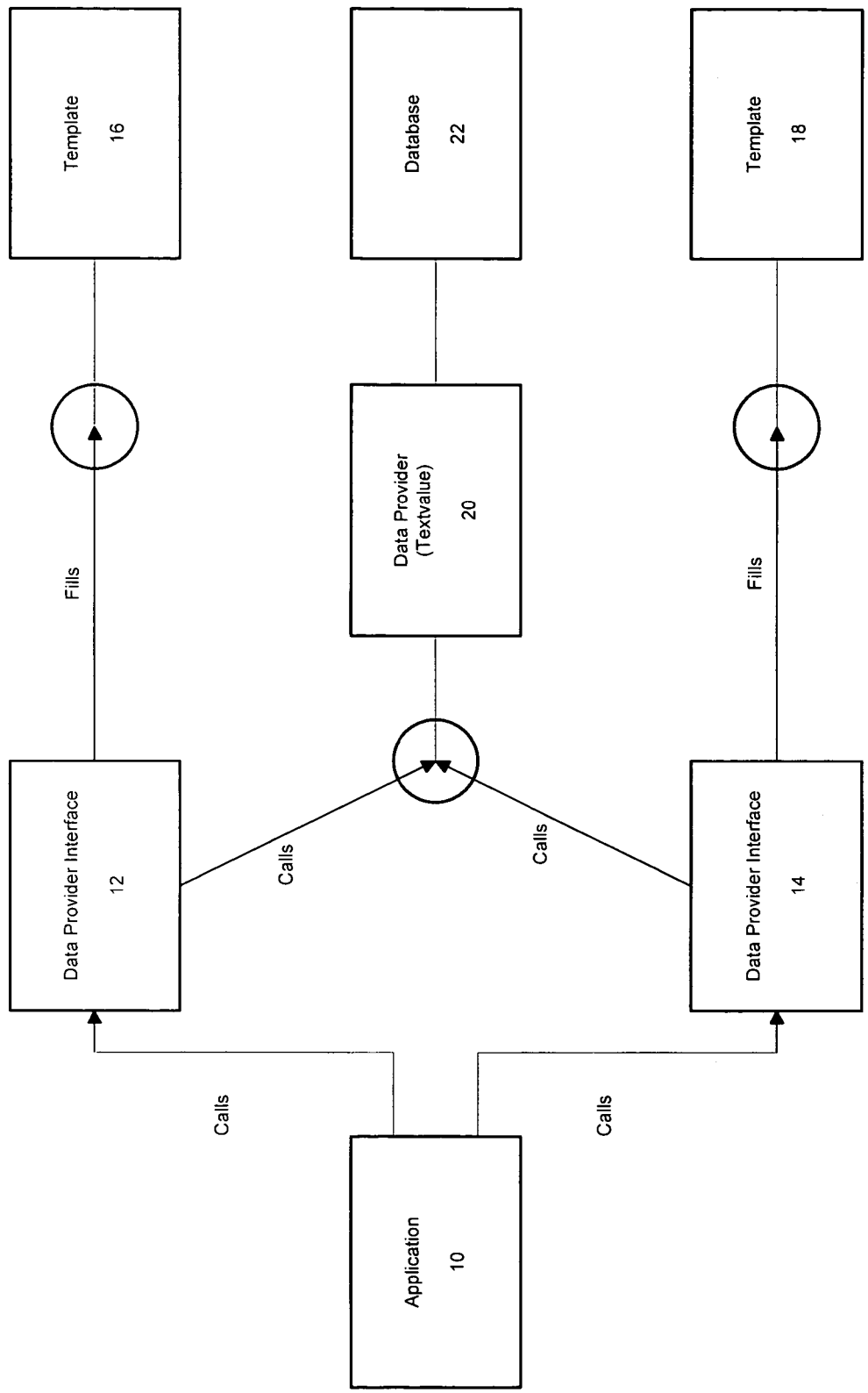
FIG. 1 is a block diagram showing the hard dependency between application, template interface and template of background systems.
Figure 2:
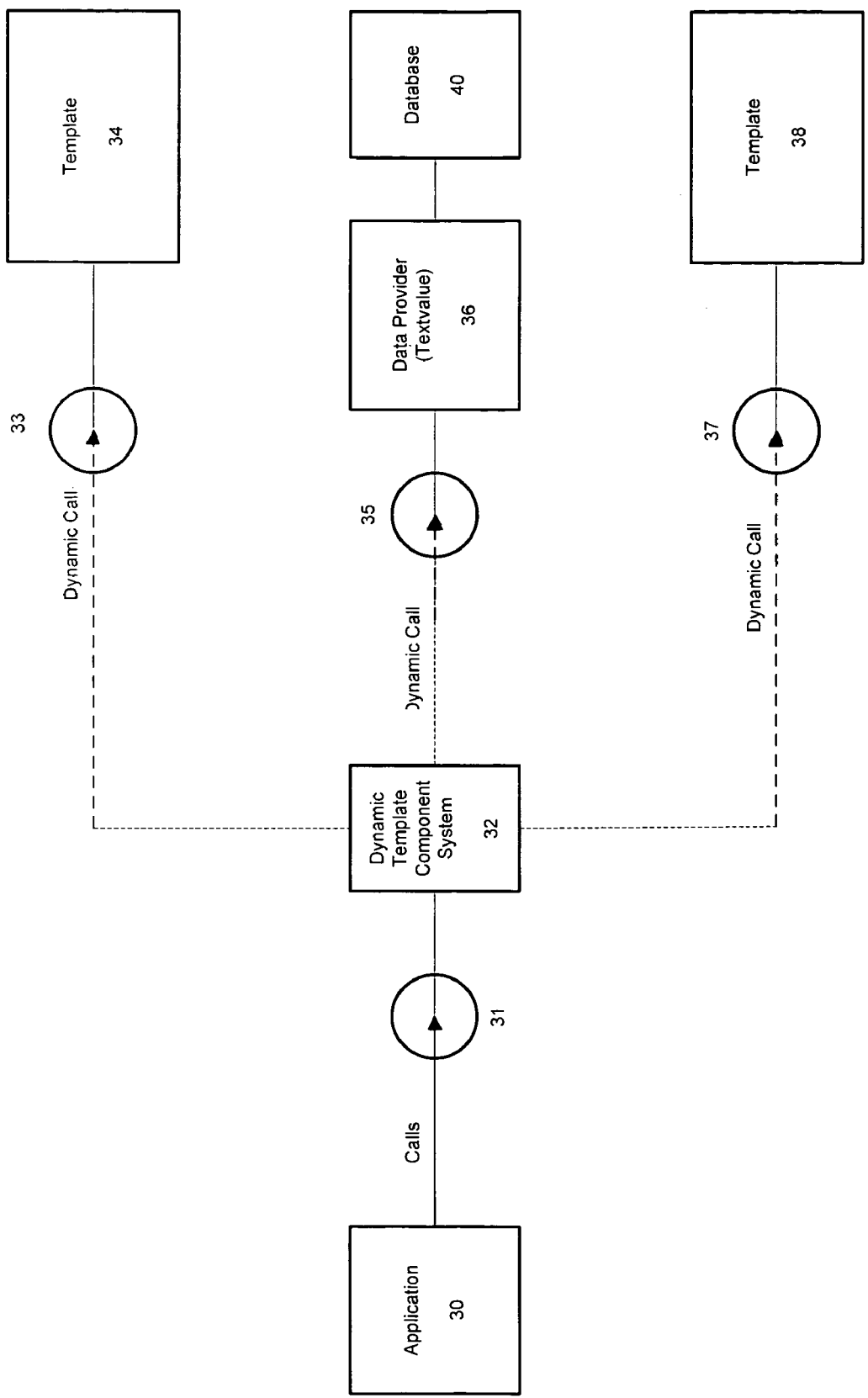
FIG. 2 is a block diagram of a system according to an embodiment of the present disclosure.

FIG. 2 is a block diagram showing an embodiment of the present disclosure. As shown, dynamic template component system 32 replaces the template interfaces specific data providers shown in FIG. 1. Accordingly, the present disclosure allows application 30 to operate independently from the template interfaces specific data providers shown in FIG. 1. For example, upon a call by application 30, dynamic template component system 32 will make a dynamic call to interface 33 of template 34 to determine the appropriate signature of the template's interface. System 32 will then dynamically call the appropriate data provider interface 35 to obtain data from data provider 36 (via database 40) for filling in attributes of the template. The same procedure will be performed on template 38 and interface 37.

Dynamic template component system 32 uses run time type information (RTTI) to analyze the interfaces 33 and 37 and to filter all attributes to be filled. Each attribute has a method assigned that is used to fill it. These methods have the same type of signature so that the system is able to call each method in a uniform way. The present system traverses the attributes of the template's interface. For every attribute, RTTI services are used to query the kind (e.g., single field, complex structure or table), the name of the attribute and its elements.

If the attribute is a complex structure or table, the system looks for a method to fill the complete structure. If there is no such method available, it breaks the structure down into its elements, starting at the template's interface (root) and terminates on data primitives like single fields (leafs). Filling a node is supported on each level of the tree by assigning a reader method to a structure or a data primitive.

Figure 3:
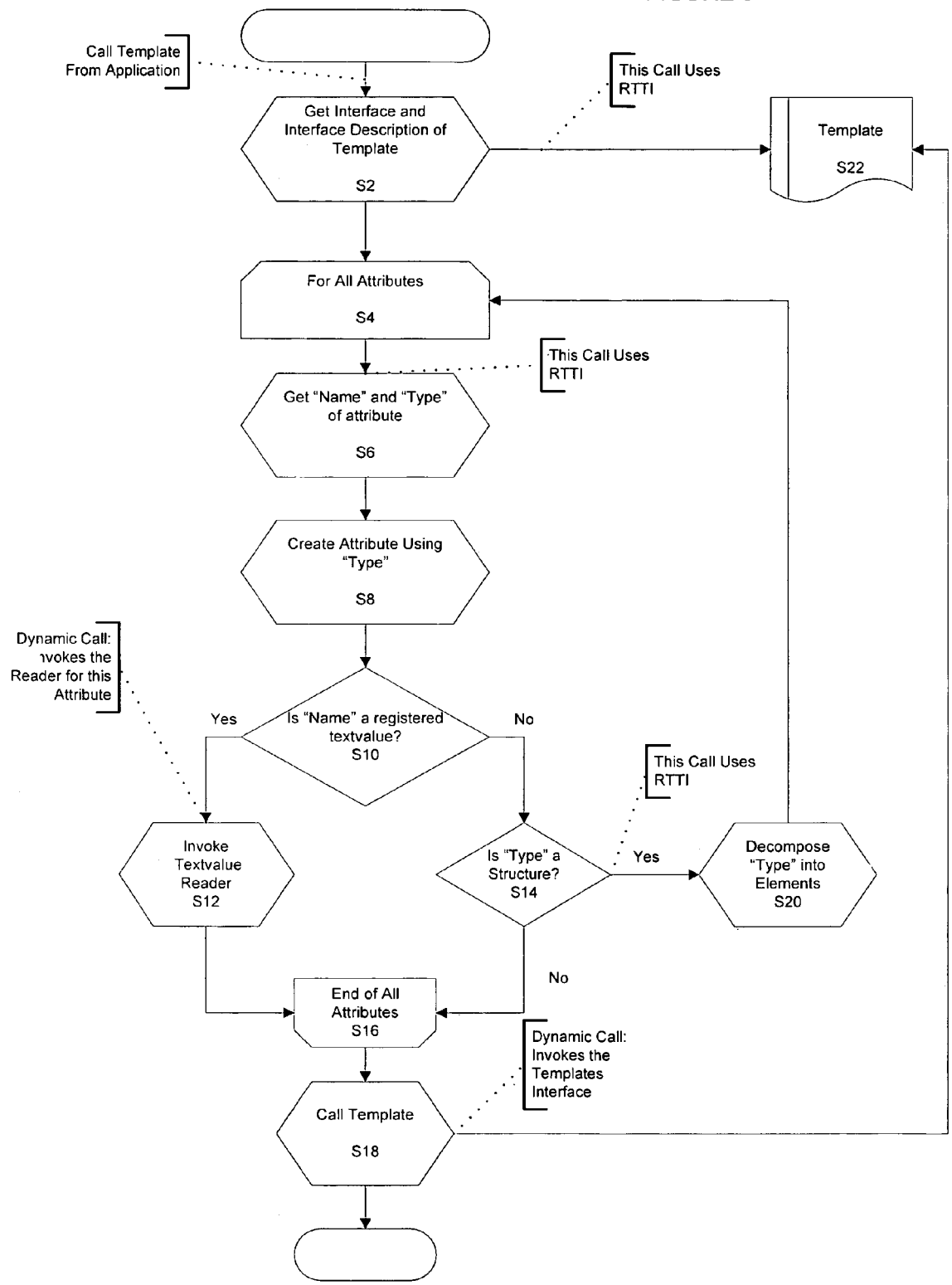
FIG. 3 is a flow chart for describing operation of the system according to an embodiment of the present disclosure.

FIG. 3 is a flow chart for describing operation of the dynamic template component system (32) according to an embodiment of the present disclosure. In response to a template call from an application 30, the system 32 gets the interface and interface description of the template (Step S2). Loop limit symbols S4 and S16 form a loop in which each attribute of the interface is examined. Using RTTI, the system gets the "NAME" and "TYPE" of the attribute (Step S6). An attribute is created using the "TYPE" (Step S8). A determination is made whether the "NAME" is a registered textvalue (Step S10). That is, a determination is made whether a method exists for filling each attribute of that type. If the "NAME" is a registered textvalue (Yes, Step S10), a dynamic call is used to invoke the textvalue reader to fill the attribute (Step S12) and the loop is repeated for the next attribute. If the "NAME" is not a registered textvalue (No, Step S10), a determination is made whether the "TYPE" is a structure. If "TYPE" is not a structure (No, Step S14), the loop is repeated for the next attribute. If the "TYPE" is a structure (Yes, Step S14), using RTTI, the structure is decomposed into its elements (or attributes) (Step S20), and the loop is repeated for the next attribute. After all attributes have been examined, a dynamic call is made invoking the templates interface (Step S18).

Figure 4:
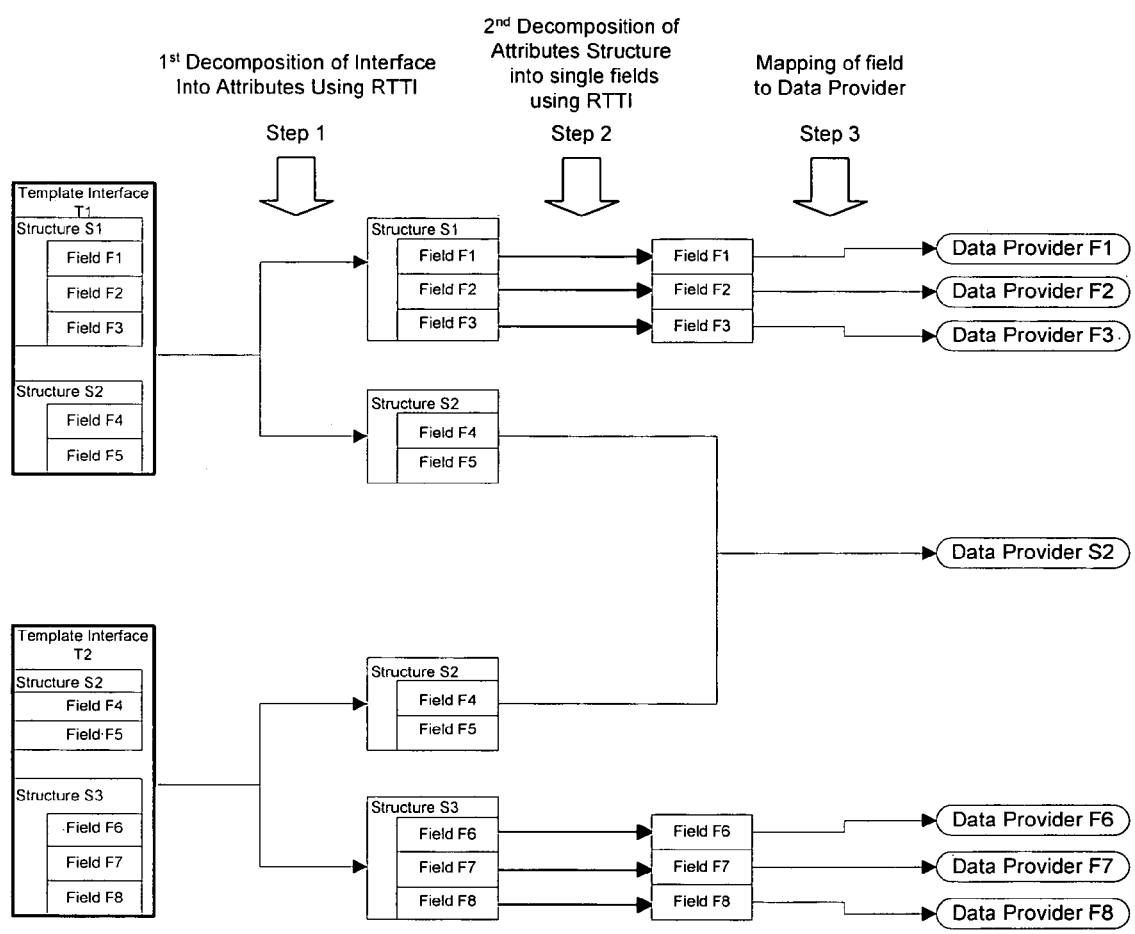
FIG. 4 is a diagram for describing the process of decomposing interfaces according to an embodiment of the present disclosure.

FIG. 4 is an example of an interface being analyzed according to an embodiment of the present disclosure. Template interface T1 and template interface T2 are shown. Template interface T1 is made up of structure S1 and structure S2. Template interface T2 is made up of structure S2 and S3. As shown, structure S1 is made up of field F1, field F2 and field F3. Structure S2 is made up of field F4 and field F5. Structure S3 is made up of field F6, field F7 and field F8.

According to an embodiment of the present disclosure, dynamic template component system 32 will analyze template interface T1 to determine whether it can find a method to fill all the elements of the template interface T1. If it cannot, the system will perform a first decomposition (Step 1) of the interface into structures S1 and S2. Assuming it can not find a method to fill all of structure S1, the system will perform a further decomposition (Step 2) of the attribute structure into single fields F1, F2 and F3. Upon finding methods to fill fields F1, F2 and F3, the system will map field F1 to data provider F1, field F2 to data provider F2 and field F3 to data provider F3 (Step S3) so that the attributes for those fields can be filled.

As further shown in FIG. 4, after the first decomposition (Step 1) of template interface T1 into structure S1 and structure S2, the system will also analyze structure S2 to determine whether it can find a method to fill all of structure S2. In this case, a method is found that can fill all of structure S2. Accordingly, structure S2 is mapped to data provider S2 so that all attributes of the structure S2 can be filled for template interface T1.

After the system determines that it cannot find a method that can fill all of structure S3 of template interface T2, the system will perform a decomposition of template interface T2 into structures S2 and S3 (Step 1). Structure S2 of template interface T2 is the same as the structure S2 of template interface T1. Accordingly, the system will use the same method to fill structure S2 again. Structure S2 is thus mapped to data provider S2.

Dynamic template component 32 will analyze structure S3. Assuming it can not find a method to fill all of structure S3, the system will perform a further decomposition (Step 2) of the attribute structure into single fields F6, F7 and F8. Upon finding methods to fill fields F6, F7 and F8, the system will map field F6 to data provider F6, field F7 to data provider F7 and field F8 to data provider F8 so that the attributes for those fields can be filled.

From an application point of view, the embodiments of the present disclosure are capable of calling the templates interface. However, the system is no longer restricted to a special data provider interface. That is, it is able to call different data provider interfaces. Accordingly, there is no longer a need to create one interface supporting all different templates. A template can now have different interfaces with only those attributes they are actually displaying.

The present system provides a substantial performance improvement because the number of methods called to fill the interface attributes is less then that needed in previous systems. In addition, the present system supports complex data structures to that these is no need for data mapping.

Another advantage of the present system is from a customer's point of view. Customers can create new templates and new interfaces or they can extend existing ones. There is no need to change their application to adopt the interfaces changes. Since everything is called dynamically and the attributes are created and filled dynamically, the application won't even notice the change. Accordingly, users only need to use a new attribute and register a method to fill it. The bridge between the template and the method used to fill the attributes is no longer hard coded and inflexible but is now called dynamically.

Embodiments of the present disclosure can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the present system can be performed by one or more programmable processors executing a computer program to perform functions of the invention by operating on input data and generating output. Method steps can also be performed by, and apparatus of the present disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the invention, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments maybe combined with each other and/or substituted for each other within the scope of this disclosure and appended claims.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of document generation comprising:
   in response to a call from an application, making a call from a dynamic template component system to a template to get a template interface and interface description of the template, the template including elements that are filled by different data providers;
   determining whether a method exists for filling all elements of the template;
   in response to a determination that a method exists for filling all elements of the template, making dynamic calls from the dynamic template component system to get appropriate data provider interfaces capable of filling all elements of the template interface;
   in response to a determination that multiple methods are needed for filling all elements of the template, decomposing the elements of the template into respective data structures containing a portion of the elements included in the template;
   making dynamic calls from the dynamic template component system directly to each of the appropriate data providers for each element of the template interface so that all elements of the template can be filled by either a method that fills all elements of the template interface or multiple methods that fill respective elements of the template interface;
   in response to an indication that a method is unavailable to fill the respective data structure, decomposing the data structure into single data fields; and
   assigning the single data fields to a data provider.

2. The method for document generation as recited in claim 1, wherein the elements of the interface comprise at least one of an attribute, a complex structure and a field.

3. A programmable computer system for document generation, said programmable computer system comprising:
   a data storage device; and
   a processor, the processor configured to:
   in response to a call from an application, make a call from a dynamic component system to a template to get a template interface and interface description of the template, the template including elements that are filled by different data providers;
   determine whether a method exists for filling all elements of the template;
   in response to a determination that a single method exists for filling all elements of the template, make dynamic calls from the dynamic template component system to get appropriate data provider interfaces capable of filling all elements of the template interface;
   in response to a determination that multiple methods are needed for filling all elements of the template, decompose the elements of the template into respective data structures containing a portion of the elements included in the template; and make dynamic calls from the dynamic template component system to each of the appropriate data providers for each element of the template interface so that all elements of the template can be filled by a method that fills respective elements of the template interface;

in response to an indication that a method is unavailable to fill the respective data structure, decompose the data structure into single data fields; and assign the single data fields to a data provider.

4. The programmable computer system for document generation as recited in claim 3, wherein the elements of the interface comprise at least one of an attribute, a complex structure and a field.

5. A machine readable storage device including computer executable code for causing a computer processor to perform a method for document generation, the method comprising:

in response to a call from an application, making a call from a dynamic template component system to a template to get a template interface and interface description of the template, the template including elements that are filled by different data providers;

determining whether a method exists for filling all elements of the template;

in response to a determination that a single method exists for filling all elements of the template, making dynamic calls from the dynamic template component system to get appropriate data provider interfaces capable of filling all elements of the template interface;

in response to a determination that multiple methods are needed for filling all elements of the template, decomposing the elements of the template into respective data structures containing a portion of the elements included in the template; and making dynamic calls from the dynamic template component system directly to each of the appropriate data providers for each element of the template interface so that all elements of the template can be filled;

in response to an indication that a method is unavailable to fill the respective data structure, decomposing the data structure into single data fields; and assigning the single data fields to a data provider.

6. The machine readable storage device for document generation as recited in claim 5, wherein the elements of the interface comprise at least one of an attribute, a complex structure and a field.

* * * * *